(12) United States Patent
Eizumi et al.

(10) Patent No.: US 8,081,556 B2
(45) Date of Patent: Dec. 20, 2011

(54) OPTICAL PICKUP APPARATUS

(75) Inventors: Kiyotaka Eizumi, Oizumi-machi (JP); Minoru Sato, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/558,468

(22) Filed: Sep. 11, 2009

(65) Prior Publication Data

US 2010/0067355 A1 Mar. 18, 2010

(30) Foreign Application Priority Data

Sep. 12, 2008 (JP) ................. 2008-235065

(51) Int. Cl.
*G11B 7/00* (2006.01)
*G11B 7/135* (2006.01)

(52) U.S. Cl. ......... 369/112.23; 369/112.12; 369/112.03; 369/112.07

(58) Field of Classification Search .................. 369/105, 369/109.01, 109.02, 110.03, 112.04, 112.07, 369/112.12, 112.23, 44.37, 44.38, 44.39, 369/44.41, 112.03

See application file for complete search history.

(56) References Cited

U.S. PATENT DOCUMENTS

| | | | | |
|---|---|---|---|---|
| 5,365,535 A | * | 11/1994 | Yamaguchi et al. | 369/121 |
| 5,886,964 A | * | 3/1999 | Fujita | 369/44.37 |
| 5,930,220 A | * | 7/1999 | Shimano et al. | 369/44.23 |
| 7,502,301 B2 | * | 3/2009 | Nagashima | 369/112.11 |
| 7,672,201 B2 | * | 3/2010 | Shibuya et al. | 369/44.41 |
| 2005/0073921 A1 | * | 4/2005 | Heor | 369/44.37 |
| 2008/0031104 A1 | * | 2/2008 | Ohnishi et al. | 369/44.37 |

FOREIGN PATENT DOCUMENTS

| JP | 2004-145915 | 5/2004 |
|---|---|---|
| JP | 2007-220175 | 8/2007 |

* cited by examiner

*Primary Examiner* — Mohammad Ghayour
*Assistant Examiner* — Aneeta Yodichkas
(74) *Attorney, Agent, or Firm* — SoCal IP Law Group LLP; Steven C. Sereboff; John E. Gunther

(57) ABSTRACT

An optical-pickup apparatus comprising: a laser-light source including first-and-second-light-emitting points for laser lights with first-and-second wavelengths which points are disposed at positions deviating in a direction optically corresponding to an optical-disc-tracking direction; a diffraction grating including a plurality of periodic structures which are joined to be different in phase from each other in the direction and each of which includes a recess and projection repeated in a direction optically corresponding to an optical-disc-tangential direction, the diffraction grating being configured to generate main-and-sub-luminous fluxes from the laser light; a holder to hold the diffraction grating to be movable in the direction corresponding to the tracking direction; a collimating lens; an objective lens to focus the main-and-sub-luminous fluxes from the collimating lens on the same track of an optical disc; and a photodetector to be applied with reflected lights of the main-and-sub-luminous fluxes from the optical disc, to generate main-and-sub-push-pull signals.

2 Claims, 6 Drawing Sheets

OPTICAL PICKUP APPARATUS

CROSS-REFERENCE TO RELATED APPLICATION

This application claims the benefit of priority to Japanese Patent Application No. 2008-235065, filed Sep. 12, 2008, of which full contents are incorporated herein by reference.

BACKGROUND OF THE INVENTION

1. Field of the Invention

The present invention relates to an optical pickup apparatus.

2. Description of the Related Art

As an optical pickup apparatus compatible with a plurality of types of optical discs different in track pitch, there is known an optical pickup apparatus employing tracking control by an inline differential push-pull method. By the inline push-pull method, laser light emitted from a laser light source is diffracted by a diffraction grating in which regions having periodic structures different in phase from each other are joined, to generate 0th order light and ±1st order diffracted lights. The 0th order light and ±1st order diffracted lights are applied to a recording layer of the optical disc, and reflected lights thereof is received, to generate a main push-pull signal and a sub push-pull signal. Then, by generating a differential push-pull signal to obtain a tracking error signal, from the main push-pull signal and the sub push-pull signal, an offset component accompanying displacement of an objective lens or inclination of the optical disc can be effectively reduced. It is known that, in the diffraction grating, by providing a central region having a periodic structure further different in phase between the regions including the periodic structures different in phase from each other, a visual-field characteristic can be improved which indicates a deterioration rate of the differential push-pull signal when the objective lens is displaced in a tracking direction (radial direction of the optical disc) (Japanese Patent Laid-Open Publication No. 2004-145915, for example.) Also, there is known an optical pickup apparatus including a laser light source for emitting laser light having a wavelength corresponding to each of the optical discs in order to be compatible with both CD (Compact Disc) and DVD (Digital Versatile Disc) (Japanese Patent Laid-Open Publication No. 2007-220175, for example.)

For example, in order to be compatible with both a CD and DVD, in a case where a diffraction grating having a plurality of periodic structures different in phase from each other is used with a laser light source for emitting laser lights having two wavelengths, the location of the diffraction grating is, in many cases, fixed such that light emitting points are in a predetermined positional relationship. For example, as shown in FIG. 14, in an optical system including a diffraction grating 210 having a plurality of periodic structures, a collimating lens 212, and an objective lens 214, the diffraction grating is fixed at a position at which the light emitting point of laser light for DVD coincides with an optical axis of the objective lens 214. In DVDs, particularly a DVD-RAM (Digital Versatile Disc Random Access Memory) has a tendency that the visual-field characteristic deteriorates. Thus, the light emitting point of the laser light for DVD is made coincide with the optical axis of the objective lens 214, and therefore, the visual-field characteristic is restrained from deteriorating.

On the other hand, since the light emitting point of the laser light for DVD is at such a position as to coincide with the optical axis of the objective lens 214, the light emitting point of the laser light for CD is at such a position deviating from the optical axis of the objective lens 214. Thus, the visual-field characteristic deteriorates in a case of CD, and the visual-field characteristic might not satisfy a required level depending on a shift amount of the objective lens 214.

SUMMARY OF THE INVENTION

An optical pickup apparatus according to an aspect of the present invention, comprises: a laser light source including a first light emitting point for laser light with a first wavelength and a second light emitting point for laser light with a second wavelength, the first light emitting point and the second light emitting point being disposed at positions deviating in a direction optically corresponding to a tracking direction of an optical disc, the laser light source being configured to selectively emit the laser light with the first wavelength or the laser light with the second wavelength; a diffraction grating including a plurality of periodic structures joined so as to be different in phase from each other in the direction optically corresponding to the tracking direction of the optical disc, each of the plurality of periodic structures including a recess and a projection repeated in a direction optically corresponding to a tangential direction of the optical disc, the diffraction grating being configured to generate a main luminous flux and a sub luminous flux from the laser light; a holder configured to hold the diffraction grating so as to be movable in the direction corresponding to the tracking direction of the optical disc; a collimating lens configured to convert the diffused main luminous flux and sub luminous flux into parallel light; an objective lens configured to focus the main luminous flux and the sub luminous flux output from the collimating lens on the same track of the optical disc; and a photodetector configured to be applied with reflected lights of the main luminous flux and the sub luminous flux focused on the optical disc, to generate a main push-pull signal and a sub push-pull signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
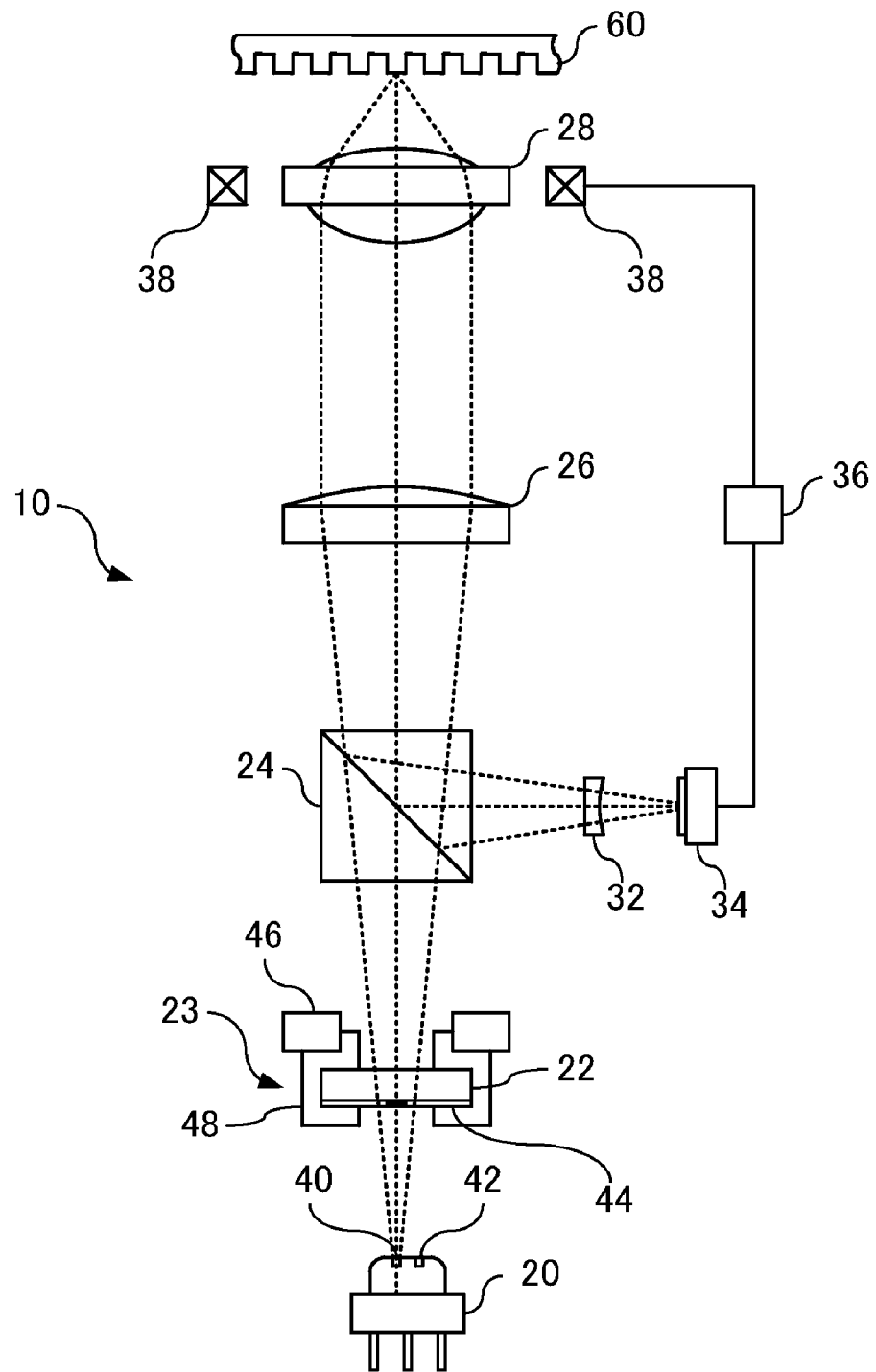
FIG. 1 is a diagram illustrating an optical pickup apparatus according to an embodiment of the present invention.

FIG. 1 is a diagram illustrating an optical pickup apparatus according to an embodiment of the present invention. An optical pickup apparatus 10 includes a laser light source 20, a diffraction grating 22, a holder 23, a beam splitter 24, a collimating lens 26, an objective lens 28, a sensor lens 32, a photodetector 34, a drive signal generation unit 36, and an objective lens driving unit 38.

The laser light source 20 is a laser diode including a light emitting point 40 (first light emitting point) for laser light having a wavelength (first wavelength) for DVD and a light emitting point 42 (second light emitting point) of laser light having a wavelength (second wavelength) for CD, which points are positioned in a direction optically corresponding to a tracking direction of an optical disc 60 with a predetermined space therebetween. Here, the wavelength for DVD is approximately 630 to 685 nm, while the wavelength for CD is approximately 765 to 839 nm.

Figure 2:
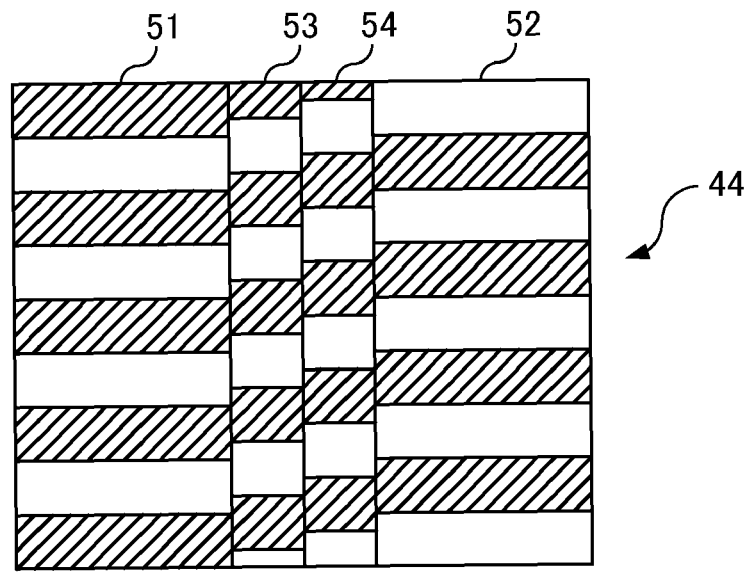
FIG. 2 is a diagram illustrating an example of a grating face of a diffraction grating.

The diffraction grating 22 includes a grating face 44 for generating 0th order light (main luminous flux) and ±1st order diffracted lights (sub luminous flux) used in the inline differential push-pull method from the laser light emitted from the laser light source 20. FIG. 2 is a diagram illustrating an example of the grating face 44. On the grating face 44, there are provided a region 51 and a region 52 for generating a phase shift of 180 degrees in a part of the laser light emitted from the laser light source 20. Specifically, the substantially rectangular regions 51 and 52 have periodic structures including projections and depressions, and the regions are different in phase from each other by 180 degrees in a direction optically corresponding to a tangential direction of the optical disc 60. In a central region between the regions 51 and 52 on the grating face 44, regions 53 and 54 that have periodic structures different in phase from the regions 51 and 52 are provided, and joined in a direction optically corresponding to the tracking direction of the optical disc 60 so as to be different in phase from each other. Specifically, the periodic structure of the region 53 is different in phase by 60 degrees from the periodic structure of the region 51 in the direction optically corresponding to the tangential direction of the optical disc 60, and the periodic structure of the region 54 is different in phase by 120 degrees and 60 degrees from the periodic structures of the regions 51 and 53, respectively, in the direction optically corresponding to the tangential direction of the optical disc 60.

The holder 23 holds the diffraction grating 22 and adjusts a position of the diffraction grating 22. Specifically, the holder 23 includes a holder 46 (first holder) allowing the entire holder 23 to move in a direction corresponding to the tracking direction of the optical disc 60 and a holder 48 (second holder) allowing the diffraction grating 22 to rotate.

The beam splitter 24 allows the 0th order light and ±1st order diffracted lights having passed through the diffraction grating 22 to pass therethrough toward the collimating lens 26, and reflects toward the sensor lens 32 reflected lights which are reflected by the optical disc 60. The collimating lens 26 converts the 0th order light and ±1st order diffracted lights, which are diffused light having passed through the beam splitter 24, into parallel light.

The objective lens 28 condenses the parallel light from the collimating lens 26, to form irradiation spots respectively corresponding to the 0th order light and ±1st order diffracted lights on a recording layer of the optical disc 60. Moreover, the objective lens 28 outputs reflected light from the recording layer of the optical disc 60 to the collimating lens 26.

The sensor lens 32 corrects aberration of the reflected light reflected by the beam splitter 24, to be output to the photodetector 34. The photodetector 34 outputs a detection signal of a level corresponding to a light amount of the received reflected light. The drive signal generation unit 36 generates a tracking error signal and a focusing error signal based on a detection signal from the photodetector 34. The objective lens driving unit 38 drives the objective lens 28 in the tracking direction or focusing direction based the tracking error signal and the focusing error signal from the drive signal generation unit 36.

Figure 3:
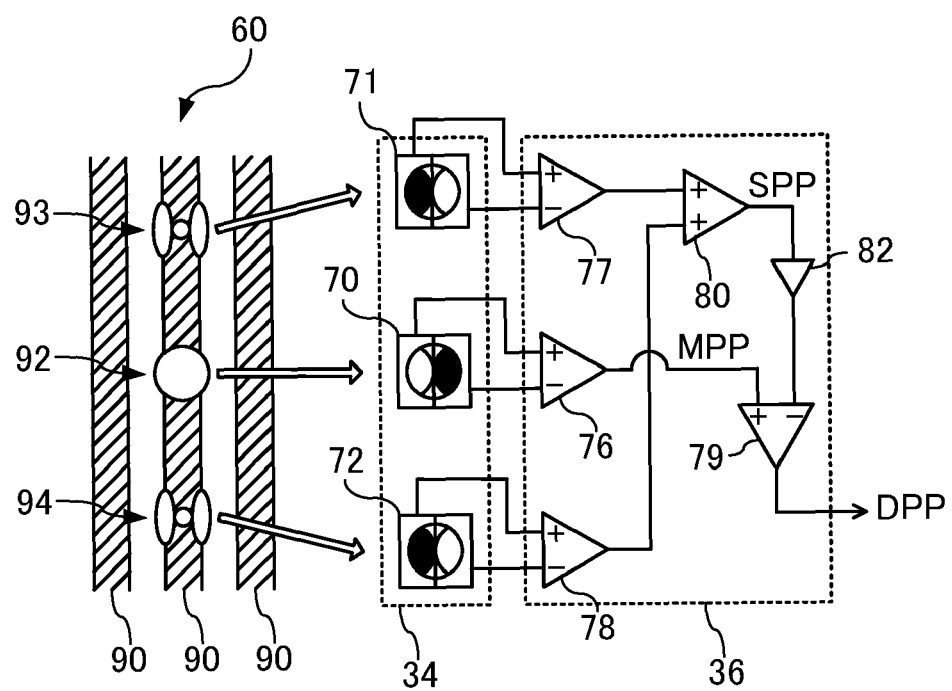
FIG. 3 is a diagram illustrating a configuration example of a part of a photodetector and a drive signal generation unit.

FIG. 3 is a diagram illustrating a configuration example of parts of the photodetector 34 and the drive signal generation unit 36. The photodetector 34 includes light receiving portions 70 to 72 for DVD. The drive signal generation unit 36 includes subtractors 76 to 79, an adder 80, and an amplifier 82. An irradiation spot 92 formed by irradiation with the 0th order light and irradiation spots 93 and 94 formed by irradiation with the ±1st order diffracted lights are on the same track 90 of the optical disc 60. The reflected light from the irradiation spots 92 to 94 becomes the 0th order light and ±1st order diffracted lights, respectively, by a diffraction function of the optical disc 60, to be applied to the light receiving portions 70 to 72. The light receiving portions 70 to 72 have light receiving surfaces each divided into two parts, for example, and difference occurs among light receiving amounts of the light receiving surfaces according to positional relation between the track 90 and the irradiation spots 92 to 94.

The subtractor 76 performs an arithmetic operation to obtain a difference in light receiving amount between the two light receiving surfaces in the light receiving portion 70, thereby generating a main push-pull signal (MPP). The subtractors 77 and 78 perform arithmetic operations to obtain a difference in light receiving amount between the two light receiving surfaces in the light receiving portions 71 and 72, respectively. Then, signals with the same phase from the subtractors 77 and 78 are added at the adder 80, and the sub push-pull signal (SPP) is generated. The main push-pull signal (MPP) and the sub push-pull signal (SPP) are opposite in phase, and the sub push-pull signal (SPP) amplified at the amplifier 82 is subtracted from the main push-pull signal (MPP) at the subtractor 79, so as to obtain a differential push-pull signal (DPP) to become a tracking error signal.

Here, the offset components, which are generated in the main push-pull signal (MPP) and the sub push-pull signal (SPP) due to displacement of the objective lens 28, inclination of the optical disc 60 and the like, are the same in phase regardless of the positions of the irradiation spots 92 to 94. Therefore, the offset component contained in the tracking error signal can be effectively reduced by means of the subtraction at the subtractor 79.

Though FIG. 3 illustrates only the light receiving portions 70 to 72 for DVD, the photodetector 34 also includes light receiving portions for CD (not shown), and the differential push-pull signal (DPP) in which the offset component is reduced is similarly generated in a case of CD as well.

Figure 4:
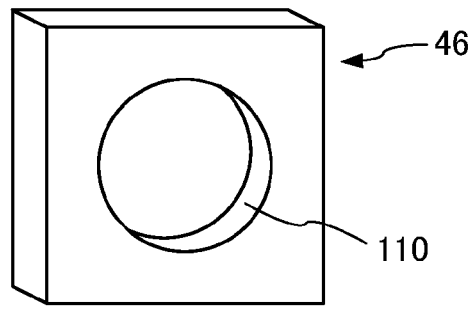
FIG. 4 is a diagram illustrating a configuration example of a holder (first holder)
Figure 5:
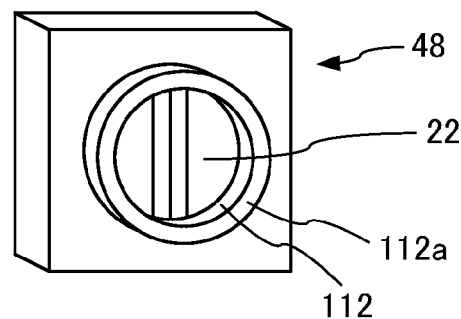
FIG. 5 is a diagram illustrating a configuration example of a holder (second holder)
Figure 6:
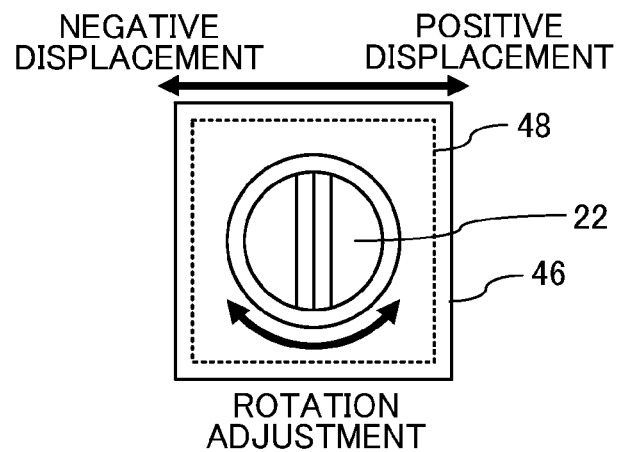
FIG. 6 is a diagram illustrating an example of a fit between holders (first holder and second holder)
Figure 7:
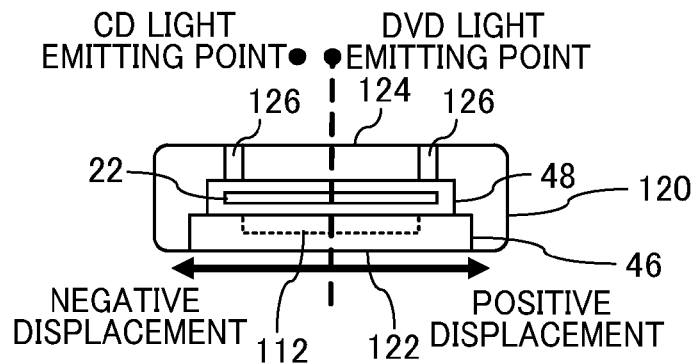
FIG. 7 is a diagram illustrating a state of a holder housed in a housing.
Figure 8:
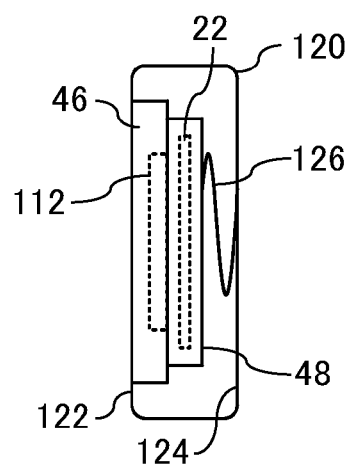
FIG. 8 is a diagram illustrating a state of a holder housed in a housing.

The holder 23 will be hereinafter described in detail. As mentioned above, the holder 23 includes the holders 46 and 48. The holder 46 is provided with a circular opening portion 110 (first opening portion) for passing therethrough the 0th order light and ±1st order diffracted lights to be output via the diffraction grating 22, as shown in FIG. 4, for example. The holder 48 holds the diffraction grating 22 as shown in FIG. 5, for example, and is provided with a circular protruding opening portion 112 (second opening portion) for passing therethrough the 0th order light and ±1st order diffracted lights to be output via the diffraction grating 22. Here, an outer circumferential diameter of a protruding portion 112*a* formed at an edge of the opening portion 112 is slightly smaller than the diameter of the opening portion 110. As shown in FIG. 6, the protruding portion 112*a* formed at the edge of the opening portion 112 of the holder 48 is fitted in the opening portion 110 of the holder 46. Moreover, the holders 46 and 48 are housed in a housing 120 as shown in FIGS. 7 and 8, and a pushing force is applied by a member for contact 126 having elasticity to the holder 48 from a wall face 124 side so that the holder 46 is brought into contact with the wall face 122. On the wall face 122 of the housing 120, there is provided an opening portion (third opening portion) for passing therethrough the 0th order light and ±1st order diffracted lights output from the opening portion 110 of the holder 46, and on the wall face 124 of the housing 120, there is provided an opening portion (fourth opening portion) for allowing laser light to enter the diffraction grating 22 held by the holder 48.

In a state shown in FIGS. 7 and 8, the holder 46 can move in a direction corresponding to the tracking direction of the optical disc 60. In an embodiment according to the present invention, in the initial state, the diffraction grating 22 is adjusted in position so that the DVD light emitting point coincides with an optical axis of the objective lens 28, for example. It is assumed that this initial position is a position of zero displacement, and in a direction corresponding to the tracking direction of the optical disc 60, displacement in a direction in which the CD light emitting point goes away from the optical axis of the objective lens 28 is positive, while displacement in a direction in which the CD light emitting point gets close to the optical axis of the objective lens 28 is negative.

Figure 9:
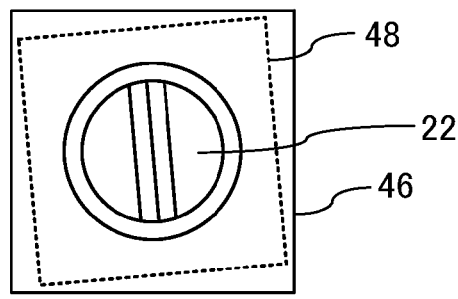
FIG. 9 is a diagram illustrating an example of rotation adjustment.
Figure 10:
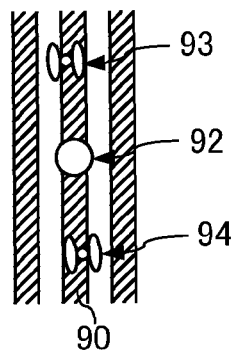
FIG. 10 is a diagram illustrating an example of an irradiation spot formed on a track of an optical disc.
Figure 11:
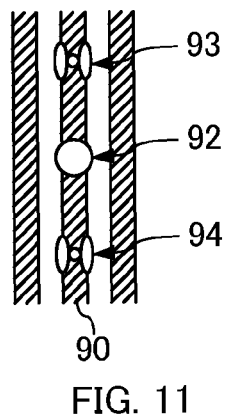
FIG. 11 is a diagram illustrating an example of an irradiation spot formed on a track of an optical disc.

As shown in FIG. 9, for example, the holder 48 can rotate using the holder 46 as a supporting board. The rotation adjustment by the holder 48 is carried out in order to form the irradiation spots 92 to 94 on the same track 90 of the optical disc 60. For example, as shown in FIG. 10, when the irradiation spots 92 to 94 are not properly formed on the same track 90, adjustment is made such that the irradiation spots 92 to 94 are properly formed on the same track 90 as shown in FIG. 11 by rotating the holder 48.

Figure 12:
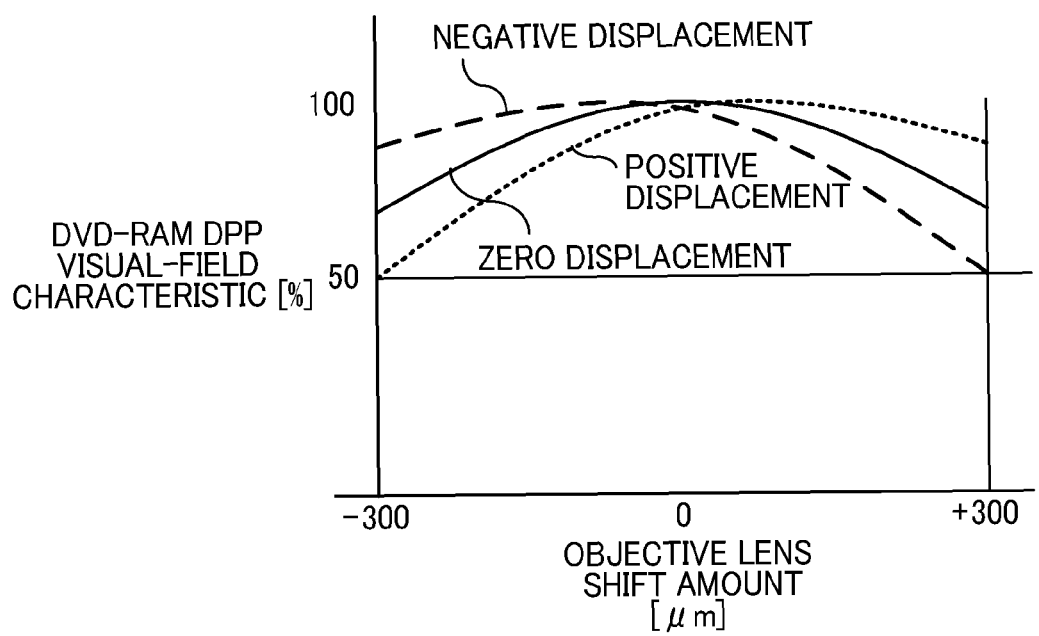
FIG. 12 is a graph illustrating an example of visual-field characteristic of a differential push-pull signal in a case where an optical disc is a DVD-RAM.

FIG. 12 is a graph illustrating an example of the visual-field characteristic of the differential push-pull signal (DPP) in a case where the optical disc 60 is a DVD-RAM. In an embodiment according to the present invention, as the initial state, the position of the diffraction grating 22 is adjusted such that the DVD light emitting point coincides with the optical axis of the objective lens 28. Therefore, as shown in FIG. 12, when the displacement of the diffraction grating 22 in the direction corresponding to the tracking direction of the optical disc 60 is zero, the visual-field characteristic becomes the maximum (100%) in a state where a shift amount of the objective lens 28 is zero, and the shift amount is almost symmetrical with respect to a point at which the shift amount is zero. When the diffraction grating 22 is displaced by a predetermined amount in the positive direction, a point at which the visual-field characteristic is the maximum is moved slightly to a positive side from the point at which the shift amount of the objective lens 28 is zero, and deterioration in the visual-field characteristic on a negative side of the shift amount of the objective lens 28 becomes greater by a corresponding amount. On the other hand, when the diffraction grating 22 is displaced by a predetermined amount in the negative direction, the point at which the visual-field characteristic is the maximum is moved slightly to the negative side from the point at which the shift amount of the objective lens 28 is zero, and deterioration in the visual-field characteristic on the positive side of the shift amount of the objective lens 28 becomes greater by a corresponding amount.

Figure 13:
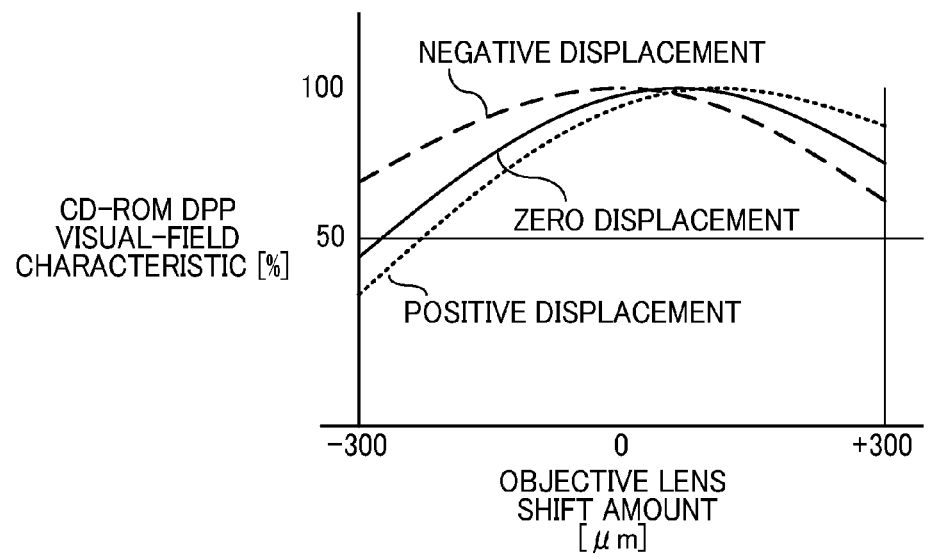
FIG. 13 is a graph illustrating an example of visual-field characteristic of a differential push-pull signal in a case where an optical disc is a CD-ROM.
Figure 14:
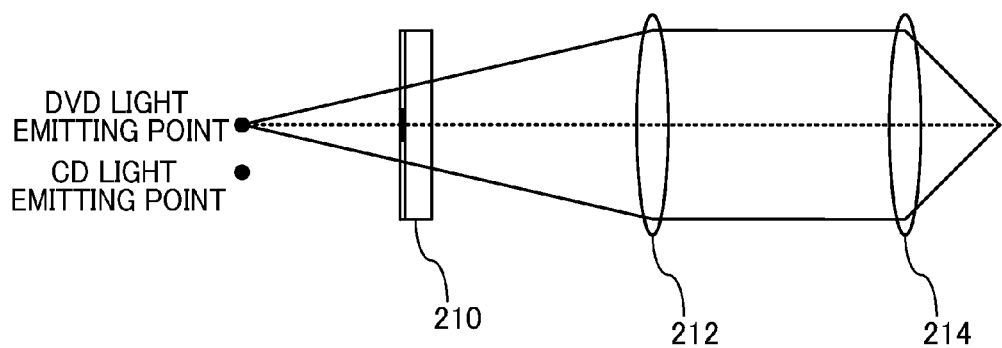
FIG. 14 is a diagram illustrating an example of a position between a light emitting point of a laser light source and a diffraction grating.

FIG. 13 is a graph illustrating an example of the visual-field characteristic of the differential push-pull signal (DPP) in a case where the optical disc 60 is a CD-ROM. In the initial state, that is, in a state where the displacement of the diffraction grating 22 is zero, since the CD light emitting point is displaced from the optical axis of the objective lens 28 to the negative side, the visual-field characteristic is the maximum at a point at which the shift amount of the objective lens 28 is slightly on the positive side. Therefore, in the case where the displacement is zero, the deterioration is greater in the characteristic on the negative side of the shift amount of the objective lens 28, and in an example in FIG. 13, the visual-field characteristic falls under 50% when the shift amount is the maximum. When the diffraction grating 22 is displaced in the positive direction, deviation between the CD light emitting point and the optical axis of the objective lens 28 becomes greater, and therefore, the deterioration in the visual-field characteristic on the negative side of the shift amount of the objective lens 28 becomes further greater. On the other hand, when the diffraction grating 22 is displaced to the negative side, the CD light emitting point gets closer to the optical axis of the objective lens 28, and the deterioration in the visual-field characteristic on the negative side of the shift amount of the objective lens 28 becomes smaller, and in an example in FIG. 13, the visual-field characteristic exceeds 50% even when the shift amount is the maximum.

As mentioned above, in the optical pickup apparatus 10, when the laser light source which selectively emits a plurality of laser lights having different wavelengths, the position of the diffraction grating 22 can be adjusted so as to satisfy the required level of the visual-field characteristic in each wavelength. That is, in the optical pickup apparatus 10, the diffraction grating 22 can be moved in the direction corresponding to the tracking direction of the optical disc 60, and thus, the position of the diffraction grating 22 can be adjusted so as to satisfy the required level of the visual-field characteristic in each of the wavelengths for CD and for DVD. For example, in a case where the visual-field characteristic changes as shown in FIGS. 12 and 13, the required level at which the visual-field characteristic is 50% or more, for example, can be satisfied in both the cases of a DVD-RAM and CD-ROM, by displacing the diffraction grating 22 to the negative side only by a predetermined amount.

The holder 23 for holding the diffraction grating 22 can include the two holders 46 and 48. As a result, in addition to the displacement of the diffraction grating in the direction corresponding to the tracking direction of the optical disc 60 by the holder 46, the rotation adjustment of the diffraction grating by the holder 48 is made possible. Therefore, it becomes possible to improve accuracy of the differential push-pull signal by adjusting the position of the diffraction grating 22 such that the irradiation spots 92 to 94 are formed on the same track 90 of the optical disc 60.

The holder 23 is supported by the member for contact 126 in the housing 120. Therefore, the holder 23 can be displaced in the direction corresponding to the tracking direction of the optical disc 60 without providing a special mechanism such as a guide rail, for example.

The above embodiments of the present invention are simply for facilitating the understanding of the present invention and are not in any way to be construed as limiting the present invention. The present invention may variously be changed or altered without departing from its spirit and encompass equivalents thereof.

For example, in an embodiment according to the present invention, the opening portion 112 of the holder 48 for rotation adjustment is in a circular shape, however, it is not limited to the circular shape but may be a polygonal shape, for example, as long as the shape allows rotation in a state where the opening portion 112 is fitted with the opening portion 110 of the holder 46. Moreover, contrary to an embodiment according to the present invention, a configuration may be made such that a protruding portion is formed in the opening portion 110 of the holder 46 so as to be fitted with the opening portion 112 of the holder 48. In this case, if the opening portion 112 of the holder 48 is formed in the circular shape, the opening portion 110 of the holder 46 is not limited to the circular shape.

Furthermore, for example, in an embodiment according to the present invention, the central region of the diffraction grating 22 is made up of the two regions 53 and 54 different in phase from each other, however, it is not limited to this as long as it is provided in order to improve the visual-field characteristic, and the central region of the diffraction grating 22 may be made up of a single region having the periodic structure different in phase from the regions 51 and 52.

What is claimed is:

1. An optical pickup apparatus comprising:
   a laser light source including a first light emitting point for laser light with a first wavelength and a second light emitting point for laser light with a second wavelength, the first light emitting point and the second light emitting point being disposed at positions deviating in a direction optically corresponding to a tracking direction of an optical disc, the laser light source being configured to selectively emit the laser light with the first wavelength or the laser light with the second wavelength;
   a diffraction grating configured for use in an in-line differential tracking method, the diffraction grating including a plurality of periodic structures having a different phase from each other in the direction optically corresponding to the tracking direction of the optical disc, the plurality of periodic structures including a center periodic structure having a different phase from periodic structures on both sides of the center periodic structure, each of the plurality of periodic structures including a recess and a projection repeated in a direction optically corresponding to a tangential direction of the optical disc, the diffraction grating configured to generate a main luminous flux and a sub luminous flux from the laser light;
   a holder configured to hold the diffraction grating so as to be such that the diffraction grating is movable in the direction corresponding to the tracking direction of the optical disc, the holder further comprising:
      a first holder movable in the direction optically corresponding to the tracking direction of the optical disc, the first holder including a first opening portion that allows the main luminous flux and the sub luminous flux to pass therethrough, and
      a second holder configured to hold the diffraction grating, the second holder fitted with the first opening portion such that the diffraction grating is rotatable, the second holder including a second opening portion that allows the main luminous flux and the sub luminous flux to pass therethrough;
   a collimating lens configured to convert the main luminous flux and sub luminous flux into parallel light;
   an objective lens configured to focus the main luminous flux and the sub luminous flux output from the collimating lens on the same track of the optical disc; and
   a photodetector configured to be applied with reflected lights of the main luminous flux and the sub luminous flux focused on the optical disc, to generate a main push-pull signal and a sub push-pull signal of a differential push-pull signal used in the in-line differential tracking method,
   wherein the diffraction grating is displaced in a direction corresponding to the tracking direction and a rotational direction, in consideration of deviation of the positions of the first and second light emitting points, so as to cause a visual-field characteristic of the differential push-pull signal based on the laser light with either of the first wavelength or the second wavelength to become greater than or equal to 50%.

2. The optical pickup apparatus according to claim 1, further comprising:
   a first wall face including a third opening portion that allows the main luminous flux and the sub luminous flux from the first opening portion of the first holder to pass therethrough;
   a second wall face including a fourth opening portion making the laser light from the laser light source enter the diffraction grating held by the second holder; and
   a member for contact provided between the second holder and the second wall face, the member for contact being configured to bring the first holder into contact with the first wall face.

* * * * *